US010162076B2

(12) United States Patent
Morris (10) Patent No.: US 10,162,076 B2
(45) Date of Patent: Dec. 25, 2018

(54) METHOD AND APPARATUS FOR CORRECTION OF TRANSIENT ELECTROMAGNETIC SIGNALS TO REMOVE A PIPE RESPONSE

(71) Applicant: Steven Allen Morris, Spring, TX (US)

(72) Inventor: Steven Allen Morris, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 190 days.

(21) Appl. No.: 15/069,039

(22) Filed: Mar. 14, 2016

(65) Prior Publication Data

US 2017/0261636 A1 Sep. 14, 2017

(51) Int. Cl.
- *G01V 1/40* (2006.01)
- *G01V 3/38* (2006.01)
- *G01V 3/08* (2006.01)

(52) U.S. Cl.
CPC . *G01V 3/38* (2013.01); *G01V 3/08* (2013.01)

(58) Field of Classification Search
CPC .................................. G01V 3/38; G01V 3/08
USPC ............................................................ 702/7
See application file for complete search history.

(56) References Cited

U.S. PATENT DOCUMENTS

| | | | |
|---|---|---|---|
| 5,581,024 A | 12/1996 | Meyer, Jr. et al. | |
| 5,883,515 A | 3/1999 | Strack et al. | |
| 5,892,361 A | 4/1999 | Meyer et al. | |
| 6,204,667 B1 | 3/2001 | Won | |
| 6,288,548 B1 | 9/2001 | Thompson et al. | |
| 6,586,939 B1 | 7/2003 | Fanini et al. | |
| 6,765,385 B2 | 7/2004 | Sinclair et al. | |

(Continued)

FOREIGN PATENT DOCUMENTS

WO 2012109433 A2 8/2012

OTHER PUBLICATIONS

"Oilfield Bucking Units", Weatherford, Tubular Running Services, [Retrieved from the Internet, Jun. 21, 2017] www.weatherford.com/doc/wft130408; 3 pages.

(Continued)

*Primary Examiner* — Anthony Ho
(74) *Attorney, Agent, or Firm* — Cantor Colburn LLP (57) ABSTRACT

Methods and systems for estimating properties of formations penetrated by boreholes are provided, including conveying a carrier through a borehole having a transmitter, a first receiver, and a second receiver, the first receiver positioned a first distance from the transmitter and the second receiver positioned a second distance from the transmitter, generating a transient electromagnetic field with the transmitter, obtaining a total signal from signals received by the first receiver and the second receiver, performing a bucking calculation to obtain a pipe signal, applying a correction scheme to the total signal to generate a corrected formation property signal, wherein the correction scheme is $V_{corr}=V_{meas}-P*V_{meas}$, wherein $V_{corr}$ is a correction signal, $V_{meas}$ is the total signal, and P is the pipe signal, estimating a formation property from corrected formation property signal to select a model of the formation, and adjusting a drilling operation based on the estimated property of the formation.

16 Claims, 8 Drawing Sheets

(56) References Cited

U.S. PATENT DOCUMENTS

| | | |
|---|---|---|
| 6,891,376 B2 | 5/2005 | Hanstein et al. |
| 7,301,429 B1 | 11/2007 | Hall et al. |
| 7,408,355 B1 | 8/2008 | Forgang et al. |
| 7,598,741 B2 | 10/2009 | Fanini et al. |
| 7,994,790 B2 | 8/2011 | Itskovich et al. |
| 8,030,935 B2 | 10/2011 | Xiao et al. |
| 8,332,152 B2 | 12/2012 | Itskovich et al. |
| 8,762,107 B2 | 6/2014 | Pelegri et al. |
| 9,310,511 B2 | 4/2016 | Itskovich |
| 9,857,499 B2 | 1/2018 | Itskovich |
| 2004/0183538 A1 | 9/2004 | Hanstein et al. |
| 2005/0049791 A1 | 3/2005 | Besplav et al. |
| 2005/0093547 A1 | 5/2005 | Xiao et al. |
| 2005/0140374 A1 | 6/2005 | Itskovich |
| 2006/0192562 A1 | 8/2006 | Davydychev et al. |
| 2007/0216416 A1 | 9/2007 | Itskovich |
| 2008/0270032 A1 | 10/2008 | Nikitenko et al. |
| 2009/0114009 A1 | 5/2009 | Thambynayagam et al. |
| 2009/0240435 A1 | 9/2009 | Itskovich et al. |
| 2009/0243618 A1 | 10/2009 | Wang et al. |
| 2010/0097065 A1 | 4/2010 | Itskovich et al. |
| 2010/0109905 A1 | 5/2010 | Itskovich et al. |
| 2010/0171501 A1 | 7/2010 | Alumbaugh et al. |
| 2011/0257886 A1 | 10/2011 | Itskovich et al. |
| 2014/0121974 A1* | 5/2014 | Itskovich ............... G01V 3/38 702/7 |
| 2015/0115965 A1 | 4/2015 | Riederman et al. |
| 2015/0241592 A1 | 8/2015 | Itskovich et al. |
| 2017/0235012 A1 | 8/2017 | Itskovich et al. |
| 2017/0261633 A1 | 9/2017 | Morris |
| 2017/0261635 A1 | 9/2017 | Morris |

OTHER PUBLICATIONS

International Search Report, International Application No. PCT/US2017/022015, dated Jun. 16, 2017, Korean Intellectual Property Office; International Search Report 3 pages.

International Written Opinion, International Application No. PCT/US2017/022015, dated Jun. 16, 2017, Korean Intellectual Property Office; International Written Opinion 11 pages.

* cited by examiner

METHOD AND APPARATUS FOR CORRECTION OF TRANSIENT ELECTROMAGNETIC SIGNALS TO REMOVE A PIPE RESPONSE

BACKGROUND

The ultimate objective of any geophysical experiment is to find properties of a formation using the measured data. To accomplish the objective a processing technique, called inversion, is applied. Inversion requires a mathematical model, which is used to produce synthetic data. The model has to include all of the necessary parameters that affect the measurements because an accurate model is needed for a successful inversion. Because the amount of recordable data is limited, no geophysical inverse problem is uniquely solvable and inferences of formation properties are statistical.

The possibility to reduce the range of uncertainty in the inverted models is driven by the sensitivity of the data to parameters of interest and a level of noise in the data. The noise can be either random or systematic. Because of this, mechanisms for improving sensitivity to the parameters of a formation have been developed. For example, a technique referred to as bucking was developed to improve sensitivity to the parameters of the formation while eliminating systematic noise caused by a primary field and/or the conductive tools used to make the measurements. If bucking does not account for electromagnetic interference between a conductive tool body and a formation, this interference will create or be a source of additional systematic noise. For this reason, it is beneficial to develop techniques for reducing inconsistency between measured and synthetic model responses and thus reduce uncertainty in estimated parameters of a formation.

SUMMARY

A method for estimating a property of an earth formation penetrated by a borehole is provided. The method includes conveying a carrier through a borehole, the carrier having a transmitter, a first receiver, and a second receiver, the first receiver being positioned at a first distance from the transmitter and the second receiver being positioned at a second distance from the transmitter, generating a transient electromagnetic field with the transmitter, obtaining a total signal from signals received by the first receiver and the second receiver, performing a bucking calculation to obtain a pipe signal, applying a correction scheme to the total signal to generate a corrected formation property signal, wherein the correction scheme is $V_{corr}=V_{meas}-P*V_{meas}$, wherein $V_{corr}$ is a correction signal, $V_{meas}$ is the total signal, and P is the pipe signal, estimating a formation property from corrected formation property signal to select a model of the formation, and adjusting a drilling operation based on the estimated property of the formation.

A system for estimating a property of an earth formation penetrated by a borehole is provided. The system includes a carrier configured to be conveyed through a borehole, a transmitter disposed on the carrier and configured to transmit transient electromagnetic fields, a first receiver disposed on the carrier a first distance from the transmitter and configured to receive signals from the transmitter and the second transmitter, a second receiver disposed on the carrier a second distance from the transmitter and configured to receive signals from the transmitter, and a processor configured to estimate a property of the formation. The system is configured to generate a transient electromagnetic field with the transmitter, obtain a total signal from signals received by the first receiver and the second receiver, perform a bucking calculation to obtain a pipe signal, apply a correction scheme to the total signal to generate a corrected formation property signal, wherein the correction scheme is $V_{corr}=V_{meas}-P*V_{meas}$, wherein Vcorr is a correction signal, Vmeas is the total signal, and P is the pipe signal, and estimate a formation property from corrected formation property signal to select a model of the formation.

BRIEF DESCRIPTION OF THE DRAWINGS

The following descriptions should not be considered limiting in any way. With reference to the accompanying drawings, like elements are numbered alike.

The detailed description explains embodiments of the present disclosure, together with advantages and features, by way of example with reference to the drawings.

DETAILED DESCRIPTION

A detailed description of one or more embodiments of the disclosed apparatuses and methods presented herein are presented by way of exemplification and not limitation, with reference made to the appended figures.

Disclosed are methods and systems for measuring pipe signals during transient electromagnetic measurements and performing a correction operation to remove a pipe signal from a measurement. Using a transient electromagnetic tool with a single transmitter and two receivers, an earth formation may be estimated accurately. Although formation signals can be negatively impacted by (e.g., convolved with) spurious pipe signals, embodiments provided herein enable combination of a total bucked signal with an error correction to enable suppression of the spurious pipe signal. By suppressing the pipe signal using a correction factor, a faithful representation of the transient formation response may be obtained.

Figure 1:
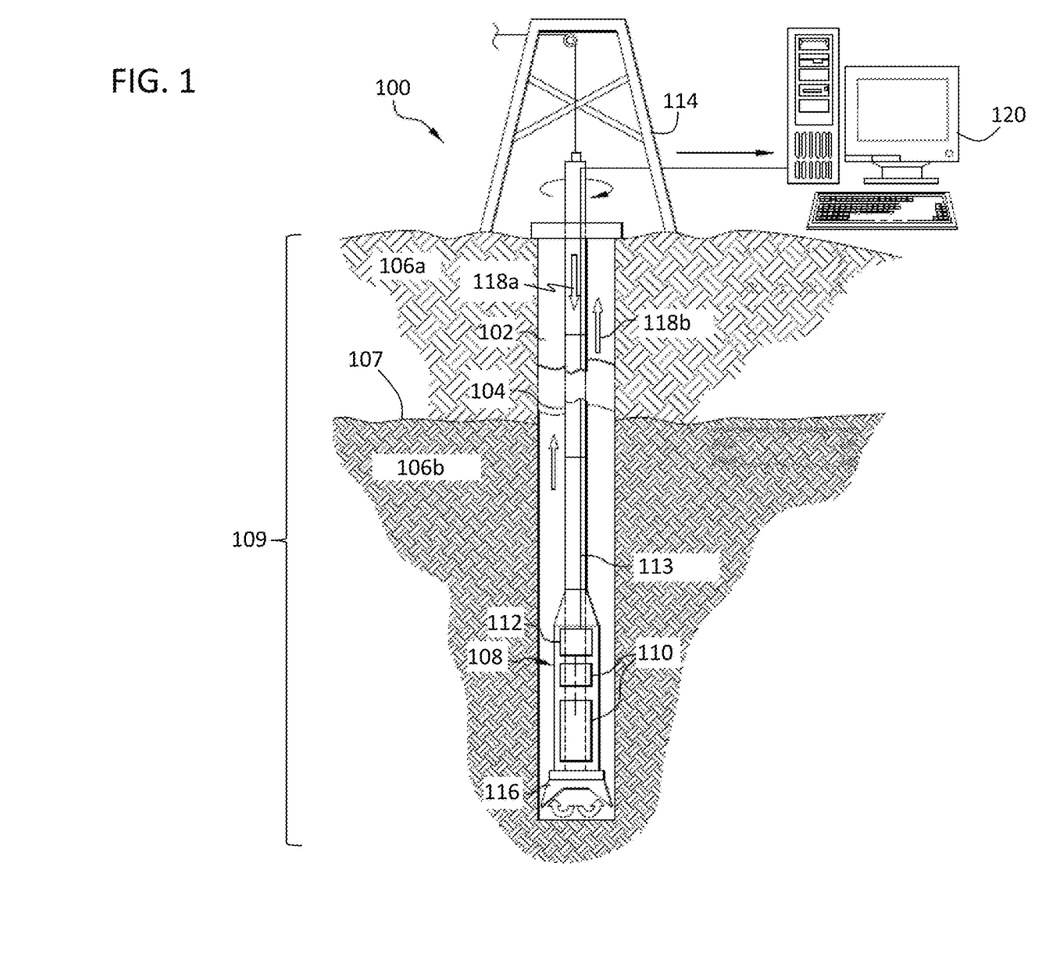
FIG. 1 is a cross-sectional view of an embodiment of a downhole drilling, monitoring, evaluation, exploration and/or production system in accordance with an embodiment of the present disclosure.

Referring to FIG. 1, a non-limiting schematic illustration of a downhole drilling, monitoring, evaluation, exploration, and/or production system 100 associated with a borehole 102 is shown. A carrier 104 is run in the borehole 102, which penetrates one or more earth formations 106a, 106b for facilitating operations such as drilling, extracting matter from the formation, sequestering fluids such as carbon dioxide, and/or making measurements of properties of the formations 106a, 106b, a formation interface 107 (i.e., the interface between the formations 106a, 106b), and/or the borehole 102 downhole. The carrier 104 includes any of various components to facilitate subterranean operations. In various embodiments, the carrier 104 is constructed of, for example, a pipe, multiple pipe sections, flexible tubing, or other structures. In other configurations, the carrier 104 is constructed of an armored wireline, such as that used in wireline logging. The carrier 104 is configured to include, for example, a drilling system and/or a bottom-hole assembly (BHA) on a downhole end thereof.

The system 100 and/or the carrier 104 may include any number of downhole tools 108 for various processes including drilling, hydrocarbon production, and formation evaluation for measuring one or more physical properties, characteristics, quantities, etc. in and/or around the borehole 102. For example, in some embodiments, the downhole tools 108 include a drilling assembly and/or a pumping assembly. Various measurement tools can be incorporated into the system 100 to affect measurement regimes such as wireline measurement applications, measurement-while-drilling (MWD), and/or logging-while-drilling (LWD) applications.

While the system 100 may operate in any subsurface environment, FIG. 1 shows the downhole tools 108 disposed in the borehole 102 penetrating the earth 109 (including a first formation 106a and a second formation 106b). The downhole tools 108 are disposed in the borehole 102 at a distal end of the carrier 104. As shown, the downhole tools 108 include measurement tools 110 and downhole electronics 112 configured to perform one or more types of measurements in LWD or MWD applications and/or operations. In a LWD or MWD configuration, the carrier 104 is a drill string. The measurements may include measurements related to drill string operation, for example.

A drilling rig 114 is configured to conduct drilling operations such as rotating the carrier 104 (e.g., a drill string) and, thus, a drill bit 116 located on the distal end of the carrier 104. As shown, the drilling rig 114 is configured to pump drilling fluid 118a through the carrier 104 in order to lubricate the drill bit 116. The drilling fluid 118a becomes a flushing fluid 118b to flush cuttings from the borehole 102.

The downhole electronics 112 are configured generate data, i.e., collect data, at the downhole tools 108. Raw data and/or information processed by the downhole electronics 112 may be telemetered along telemetry 113 to the surface for additional processing or display by a computing system 120. In some configurations, drilling control signals are generated by the computing system 120 and conveyed downhole the downhole tools 108 or, in alternative configurations, are generated within the downhole electronics 112 or by a combination thereof. The downhole electronics 112 and the computing system 120 may each include one or more processors and one or more memory devices.

Different layers or formations of the earth 109 may each have a unique resistivity. For example, the first formation 106a may have a first resistivity and the second formation 106b may have a second resistivity. Depending on the compositions of the first formation 106a and the second formation 106b, the first resistivity may be different from the second resistivity. In order to measure and/or detect these resistivities, and thus extract information regarding the formations 106a, 106b, and/or the interface 107 therebetween, the downhole tools 108 are configured to obtain electromagnetic information. Accordingly, the downhole tools 108 include one or more transmitters (transmitter coils) that turn a current impulse in a transmitter coil on and off to induce a current in the earth 109 (e.g., formations 106a, 106b). One or more receivers are be configured to receive a resulting transient electromagnetic (TEM) signal. Those of skill in the art will appreciate that the transmitter(s) and receiver(s) may be one-, two-, or tri-axis devices, and/or other transceiver devices may be employed without departing from the scope of the present disclosure. In some embodiments, the transmitters may be configured with electromagnets and/or switchable permanent magnets to induce currents in the earth 109.

Figure 2:
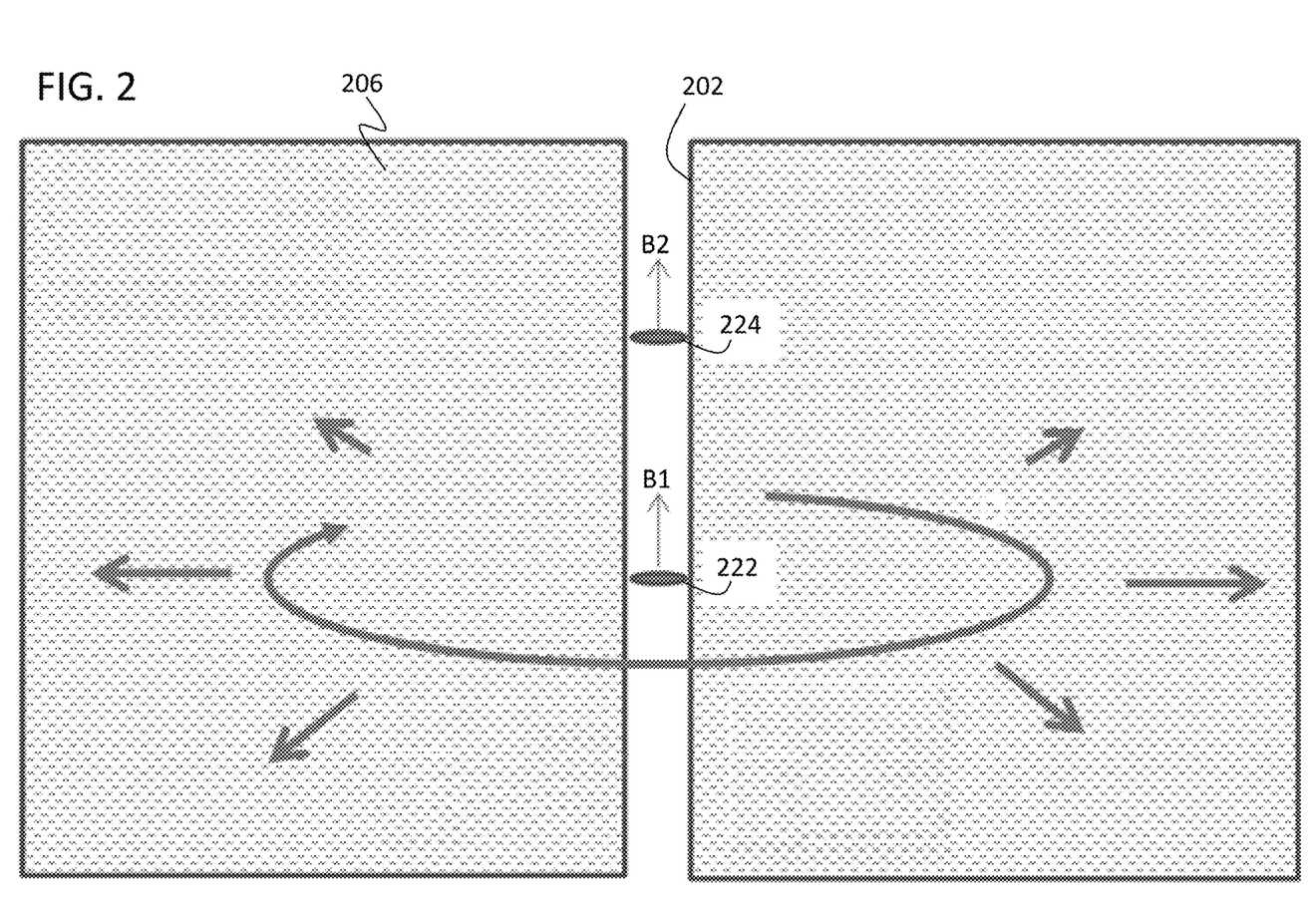
FIG. 2 is a schematic illustration of electric currents generated in a formation in accordance with an embodiment of the present disclosure.

Turning now to FIG. 2, a schematic illustration of a transient electromagnetic method of downhole geophysical measurement is shown. A formation 206 is shown having a borehole 202 formed therein. Components of a downhole tool are schematically shown as a transmitter 222 and a receiver 224. The transmitter 222 is configured to employ a fast reversing magnetic dipole, denoted as primary magnetic field B1 to induce currents in the formation 206. These currents diffuse outward away from the borehole 202, as schematically illustrated. The currents within the formation generate a secondary magnetic field B2. As configured, a derivative of the secondary magnetic field B2 is sensed by the receiver 224. Accordingly, a measurement obtained by the downhole tool, e.g., receiver 224, consists of transient voltages generated in coils of the received 224. Inversion of geophysical data (e.g., the measured voltage at the receiver 224) enables making inferences about properties of the formation 206 from the acquired data. Mathematically, the inferences involve a process of finding a model that provides a best-fit between the measurements and synthetic data, wherein the synthetic data is data configured to remove known uncertainties.

For example, the fast reversing magnetic dipole of the transmitter 222 may induce eddy currents in the carrier that supports and carries the downhole tools including the transmitter 222 and the receiver 224 (e.g., as shown in FIG. 1), which results in uncertainty in the model fitting. For example, when an electrically conductive structural member forms part of the carrier (e.g., a drill string), uncertainty in signals can arise. In one non-limiting example, a drill collar is configured to carry a transient electromagnetic apparatus (e.g., the electromagnetic apparatus includes the transmitter 222 and the receiver 224).

Figure 3:
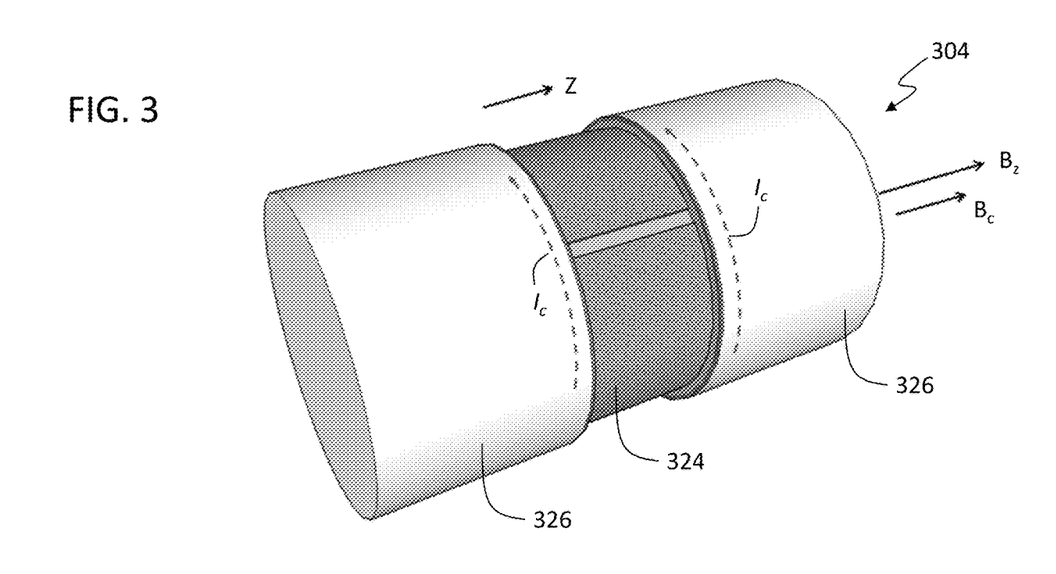
FIG. 3 is a schematic illustration of a portion of a carrier in accordance with an embodiment of the present disclosure.

As shown in FIG. 3, an illustration of the interaction of transmitted magnetic field and magnetic field from currents induced in the carrier 304 during a transient measurement are shown. In the configuration of FIG. 3, a transmitter (not shown) is oriented in the axial direction, designated as a Z direction. A receiver 324 is configured as a coil (not shown) wound circumferentially around a cylindrical magnetically permeable core mounted in a recess of the carrier 304, such as a conductive metallic mandrel 326 of a downhole tool. At the beginning of a transient measurement, the transmitter, located a predetermined distance away in the Z direction, may produce a step Bz in magnetic field along the axis of the receiver 324 (e.g., along the Z direction of the receiver 324). The magnetic core of the receiver 324 shields the carrier 304 from the step Bz in magnetic field, but at the edges of the magnetic core of the receiver 324 a circumferential current Ic may be induced in the metallic mandrel 326 of the carrier 304. In accordance with Lenz's Law the induced circumferential current Ic will produce a magnetic field Bc that opposes the transmitter induced step Bz in magnetic field.

Accordingly, a summation of the transmitter magnetic field (e.g., Bz) and carrier current induced magnetic field (e.g., Bc) to produce the total axial magnetic field in the vicinity of the receiver 324 is a measured magnetic field, and thus modified from an actual induced current from a formation. The total magnetic field (e.g., measurement) consists of a step from the transmitter and an opposing magnetic field from the carrier currents, which have a magnitude that decreases with time. Accordingly, a total sum and a secondary field that is induced by the sum in the formation can be measured.

This additional magnetic field can result in measurements that deviate from a desired measurement. That is, the additional magnetic field alters measured results and thus impacts models that are desired to determine a structure, composition, and/or other characteristic of one or more formations in the earth. As time passes during measurements, the cumulative effect of the carrier field Bc causes formation response to diverge significantly from formation response to step Bz without the carrier field. Synthetic responses generated during inversion for comparison to measured response are based only on response to a transmitter step Bz. Because of this, deviation of response to step Bz caused by carrier field Bc will produce errors in the inversion. Also, while the magnetic field from carrier currents affects a formation response, it may also dominate a signal measured in the receiver, effectively masking a formation response during the measurement.

Figure 4:
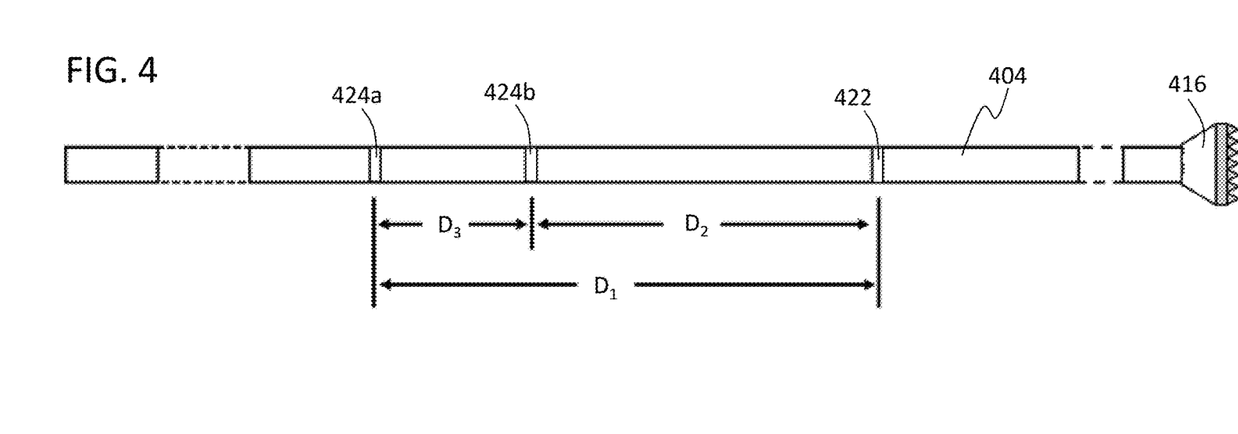
FIG. 4 is a schematic illustration of a carrier having a drill bit configured in accordance with an embodiment of the present disclosure.

Referring to FIG. 4, a schematic illustration of a carrier 404 configured to account for a carrier induced signal is shown. The carrier 404 is configured to perform an operation referred to as bucking, wherein a carrier induced signal is detected and then removed from a total signal to thus extract out a formation signal. As shown, the carrier 404 is configured with a bit 416 disposed on a distal end of the carrier 404. A transmitter 422 is located on the carrier 404 and a first, or main, receiver 424a is located on the carrier 404 at a first distance D1 from the transmitter 422. A second, or bucking, receiver 424b is located on the carrier 404 at a second distance D2 from the transmitter 422. The carrier induced signal is suppressed by using the two receivers 424a, 424b which are spaced apart by a third distance D3 (i.e., the difference between distances D1 and D2). The signal induced in the receivers 424a, 424b by carrier currents is proportional to the cube of the distance between the specific receiver 424a, 424b and the transmitter 422, while a formation signal is almost equal in each receiver 424a, 424b. This allows the carrier signal to be bucked out (e.g., eliminated and/or accounted for) and the measured formation signal is extracted. As shown, the bucking receiver (second receiver 424b) is shown as closer to the transmitter 422 than the main receiver (first receiver 424a). This configuration is merely provided for illustrative purposes and is not intended to be limiting.

The bucking process is used to reduce uncertainty in measured data. However, other sources of uncertainty exist, such that additional techniques are desirable. In addition to the bucking technique, synthetic data may be used to reduce the uncertainty of measurements, thus enabling better modeling and/or fits to models. The synthetic data is data that represents certain characteristics or components of a signal which are then accounted for in processing of measured real-world data, such that the output is an accurate reflection of the characteristics, features, and/or properties of the formation located in the earth. For example, if real-world data (e.g., measurements) are affected by a conductivity of a carrier in a downhole operation, the synthetic data have to be affected by the carrier as well. As provided herein, methods and processes for providing a basic measurement of a formation response by bucking out a pipe response are provided.

Problems may arise with transient measurements in the presence of pipe signals. For example, a pipe signal may affect a transient electromagnetic measurement in two ways. First, the pipe signal can produce a formation response that varies significantly from the response of the formation to the transmitter's dipole step reversal. Second, the receiver voltages consist of the formation responses convolved with the pipe signal, so the receiver voltages can be dominated by the pipe signal.

Further, problems may arise with respect to formation model inversion. For example, the first item listed above can cause problems with inversion routines used to produce an earth model from a measured signal. In an inversion scheme, an earth model is proposed and a curve of the formation response is generated using forward modeling software. The model curve is compared to the measured curve and a search algorithm is employed to vary the earth model parameters and iterate until the model curve approximately matches the measured response. Under current schemes, the forward modeling software does not account for the effect of the pipe signal on the formation response, so the inversion routine may fail to converge or may produce an erroneous model.

Moreover, problems may arise with respect to dynamic range and bucking coefficient estimation. The second item, discussed above, causes dynamic range problems when extracting the formation signal through bucking.

Figure 5:
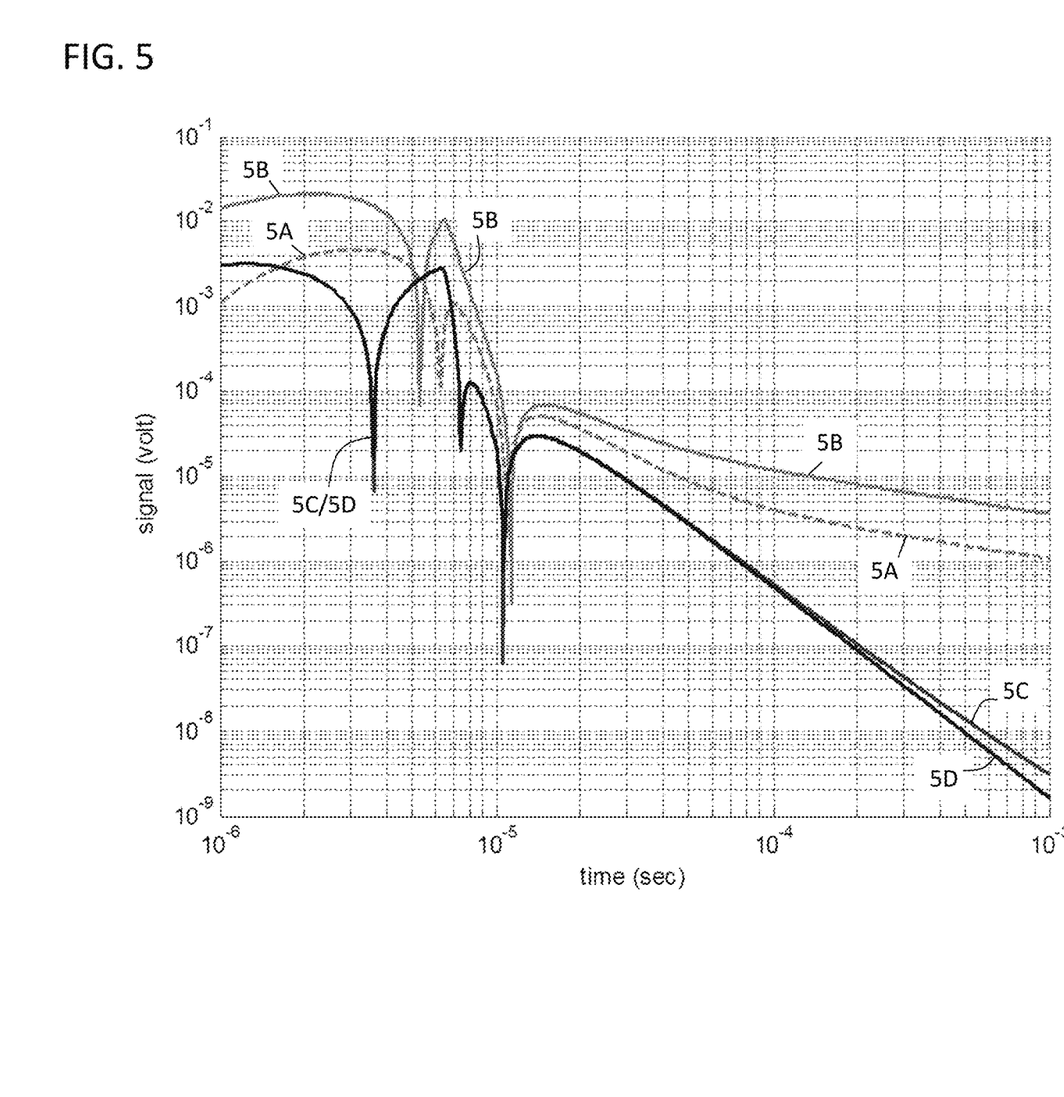
FIG. 5 is a schematic plot of signals as a function of time demonstrating that a response is dominated by a pipe signal.

For example, as shown in FIG. 5, the received signals in the coils are dominated by the pipe signal. In FIG. 5, curve 5A is the main coil signal, curve 5B is the bucking coil signal, curve 5C is the bucked signal (with pipe), and curve 5D is a no-pipe signal (e.g., formation only). The bucking calculation requires that two large numbers (e.g., curves 5A, 5B) be subtracted to produce the small formation signal (e.g., curve 5D). While this is generally practical to do when the received signals are up to ten times the extracted signal, it becomes increasingly difficult as the received signals approach one hundred to one thousand times the extracted signal. Any error in the estimation of the bucking coefficient can produce large errors in the extracted signal. One solution to alleviate this is by lengthening the sensors and employing copper shields to reduce the pipe signal, but mechanical constraints in LWD tool design can severely limit such a solution. Best sensor designs result in about a 100:1 ratio of received signal to extracted formation signal at the 200 to 300 microsecond limit of the measurement.

As will be appreciated by those of skill in the art, and described above, a formation has a resistivity associated therewith. The resistivity of the formation enables measurements of magnetic fields such that data may be generated that are representative of the formation. This data is then used to find a best-fit model, and thus an estimation of the physical characteristics and/or make-up of the formation may be made. Further, as noted above, a carrier, particularly a metallic carrier, introduces uncertainty when fitting a model to the data. One source of such uncertainty is a magnetic field induced by the carrier itself, as described above, and can be accounted for using a bucking process.

In accordance with embodiments provided herein, two pipe signals P1 and P2, detected at the first and second receivers respectively, are the receiver responses with no formation to a unit dipole step. The first receiver is positioned at a first distance $d_1$ from the transmitter and the second receiver is positioned at a second distance $d_2$ from the transmitter. The responses of the receivers are a combined response to the pipe currents adjacent to the transmitter and to the local pipe currents adjacent to the respective receiver. There is some interaction of the receivers that produces a slight difference between $P_1$ and $P_2$. However, as appreciated by those of skill in the art, the difference may generally be ignored, and it may be assumed that the two pipe signals $P_1$ and $P_2$ are equal:

$$P_1(t)=P_2(t)=P(t) \qquad \text{Eq. (1)}$$

Assuming M is a transmitter-receiver moment product, it is defined that a first voltage $V_1$ at the first receiver and a second voltage $V_2$ at the second receiver is:

$$V_1=M[\delta(t)+P(t)]*F_1(t) \qquad \text{Eq. (2)}$$

$$V_2=M[\delta(t)+P(t)]*F_2(t) \qquad \text{Eq. (3)}$$

As used above, $\delta(t)$ is the impulse and is the receiver response to a unit step in magnetic field. Further, P(t) is a voltage response of the receiver due to pipe currents as defined above (i.e., Eq. (1) defines this term as equal or the same for both receivers). The responses ($M[\delta(t)+P(t)]$) are convolved (indicated as "*") with a receiver voltage response to the formation, $F_1(t)$ and $F_2(t)$, respectively.

Moreover, a bucking coefficient k can be defined as the cube of the ratio of the receiver to transmitter distances:

$$k = \left(\frac{d_2}{d_1}\right)^3 \qquad \text{Eq. (4)}$$

Those of skill in the art will appreciate that the bucking coefficient can be obtained using other methods and/or processes. For example, in some non-limiting embodiments, the bucking coefficient may be obtained experimentally. Thus, the present disclosure is not limited to Eq. (4) for obtaining the bucking coefficient. Having the voltage for each receiver and knowing the bucking coefficient k a bucking calculation may be performed using the measured voltages, e.g., perform a bucking calculation using Eq. (2) and Eq. (3):

$$V_1-kV_2=M[F_1(t)-kF_2(t)]+MP*[F_1(t)-kF_2(t)] \qquad \text{Eq. (5)}$$

As noted, the symbol denotes convolution. Equation (5) defines the measurement of the transient electromagnetic tool and is an accurate model of the measured signal of the tool. The first term on the right side of Eq. (5) ($M[F_1(t)-kF_2(t)]$) is a bucked formation dipole response, while the second term ($MP*[F_1(t)-kF_2(t)]$) is a bucked formation pipe response. While the bucked formation pipe response is small compared to the dipole formation response, this response must be accounted for when performing inversion, particularly at late times in high resistivity formations.

To simplify, the bucked dipole response can be denoted as $F_{BU}$ and the bucked measured response can be denoted as $V_{meas}$:

$$F_{BU}=M[F_1(t)-kF_2(t)] \qquad \text{Eq. (6)}$$

$$V_{meas}=V_1-kV_2 \qquad \text{Eq. (7)}$$

Combining Eqs. (5), (6), and (7) yields:

$$V_{meas}=F_{BU}+P*F_{BU} \qquad (8)$$

Note again that $V_{meas}$ is the measured tool bucked response, $F_{BU}$ is the bucked formation dipole response, and $P*F_{BU}$ is the error term in the measurement that needs to be eliminated. Ideally, the measured curve used for inversion should consist only of the bucked formation response and the error term $P*F_{Bu}$ would be zero.

Figure 6:
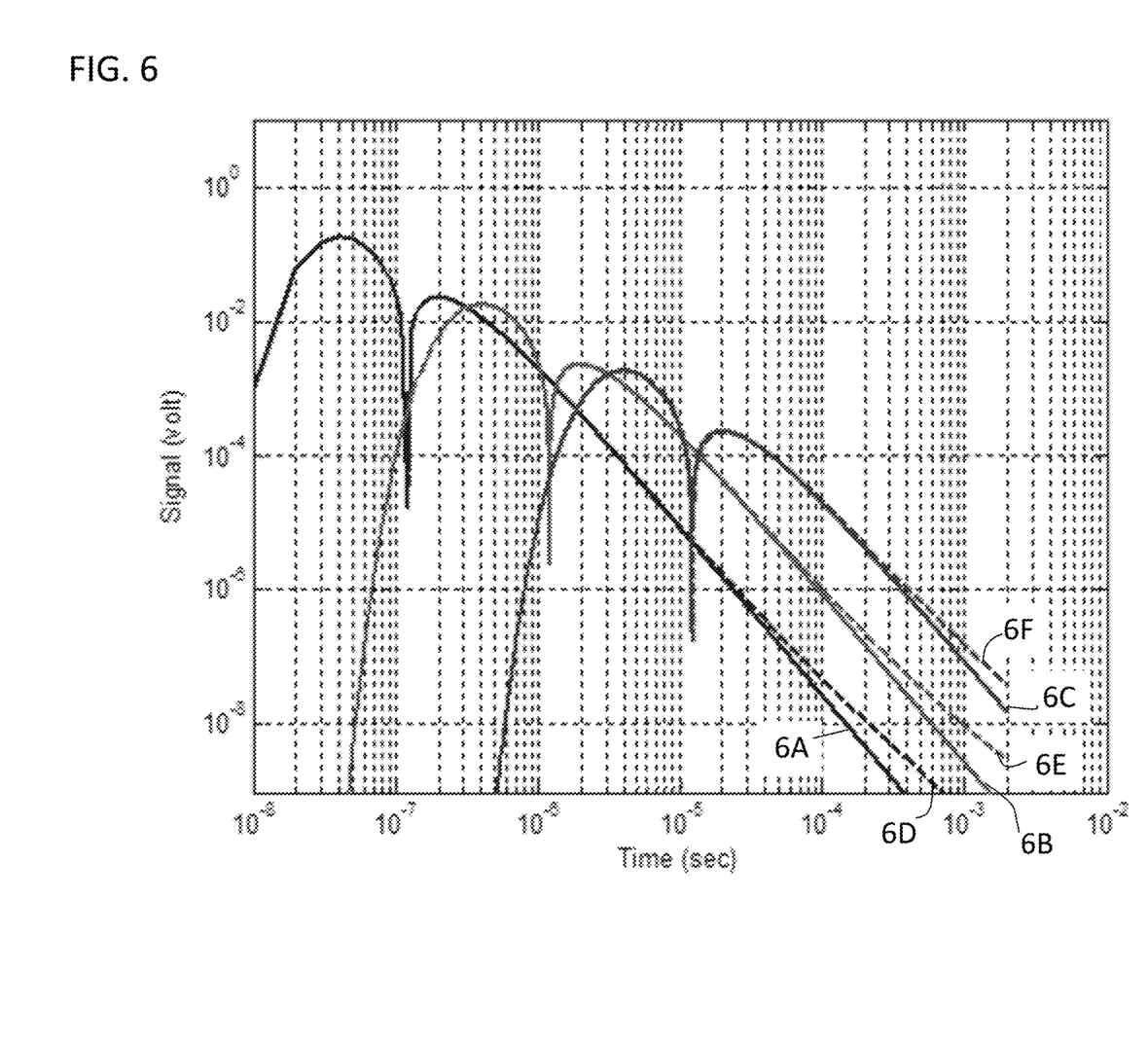
FIG. 6 is an illustrative plot of a tool response to various homogeneous formation resistivities is plotted as a function of time.

Turning to FIG. 6, a tool response to various homogeneous formation resistivities is plotted as a function of time. Solid lines are bucked dipole responses and the dashed lines are measured responses. Curve 6A is a bucked dipole response with a homogeneous formation resistivity of 100 Ω-m; Curve 6B is a bucked dipole response with a homogeneous formation resistivity of 10 Ω-m; and Curve 6C is a bucked dipole response with a homogeneous formation resistivity of 1 Ω-m. Curve 6D is a measured response with a homogeneous formation resistivity of 100 Ω-m; Curve 6E is a measured response with a homogeneous formation resistivity of 10 Ω-m; and Curve 6F is a measured response with a homogeneous formation resistivity of 1 Ω-m.

In other words, FIG. 6 shows the bucked formation response $F_{BU}$ as the solid lines (curves 6A-6C) and measured curves $V_{meas}$ as dashed lines (curves 6D-6F) for homogeneous formation resistivity of 100, 10, and 1 Ω-m. This is for transmitter-receiver product of approximately 100 A-m$^4$, transmitter-main receiver spacing of 30 feet, and transmitter-bucking receiver spacing of 20 feet. As can be seen in the figure, the error between dipole response (curves 6A-6C) and measured response (curves 6D-6F) increases at higher resistivity, as indicated by the separation of the dashed lines from the solid lines later in time. Note however, that over the range of the measurements, the measured response (curves 6D-6F) is mostly equal to the corresponding dipole response (curves 6A-6C).

Figure 7:
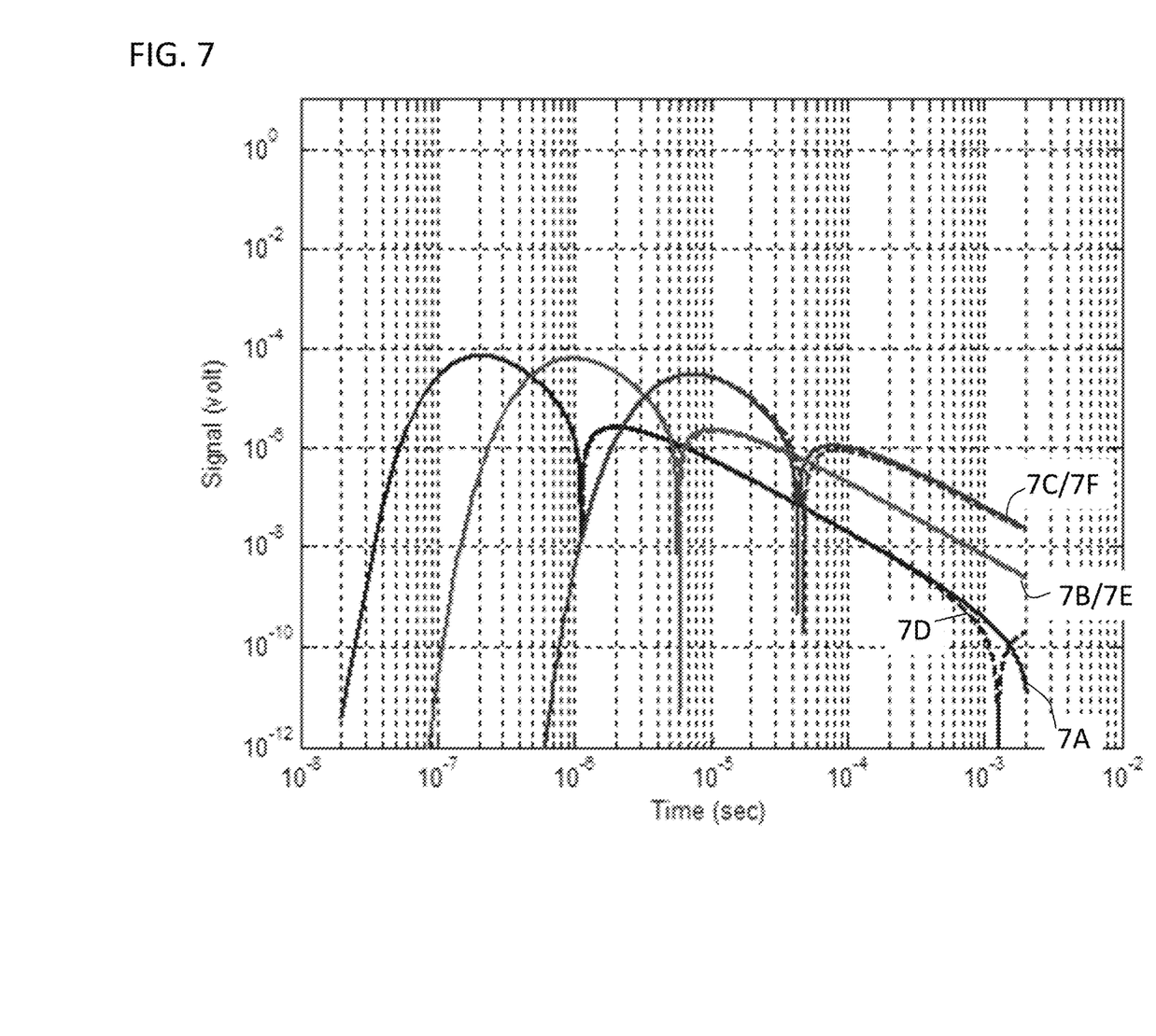
FIG. 7 is an illustrative plot of a corrective scheme in accordance with an embodiment of the present disclosure.

FIG. 7 illustrates the error term of Eq. (7) shown in solid lines. This plot shows error term $P*F_{BU}$ of Eq. (8), the convolution of the pipe signal with the bucked dipole response as solid curves (curves 7A-7C), compared to the approximation $P*V_{meas}$ obtained by convolving the pipe signal with the measured voltage, as dashed curves (curves 7D-7E). Similar to FIG. 6, Curve 7A is an error term with a homogeneous formation resistivity of 100 Ω-m; Curve 7B is a an error term with a homogeneous formation resistivity of 10 Ω-m; and Curve 7C is a an error term with a homogeneous formation resistivity of 1 Ω-m. Curve 7D is an approximation with a homogeneous formation resistivity of 100 Ω-m; Curve 7E is an approximation with a homogeneous formation resistivity of 10 Ω-m; and Curve 7F is an approximation with a homogeneous formation resistivity of 1 Ω-m. As shown in FIG. 7, convolution of the pipe signal with the measured voltage (curves 7-D-7F) produces a very good estimate of the error term (curves 7A-7C), except for a point past 1 ms on the 100 Ω-m curve.

Given this, a correction scheme can be derived. From FIG. 7, and using the discussion in the preceding paragraph:

$$P*F_{BU} \approx P*V_{meas} \qquad \text{Eq. (9)}$$

A corrected measured curve $V_{corr}$ can be obtained by subtracting the left side of Eq. (9) from Eq. (8) to obtain:

$$V_{corr}=V_{meas}-P*V_{meas}=F_{BU}+P*F_{BU}-P*V_{meas} \approx F_{BU} \qquad \text{Eq. (10)}$$

From this result the correction scheme can be stated to remove the bucked formation pipe response from the measured curves:

$$V_{corr}=V_{meas}-P*V_{meas} \qquad \text{Eq. (11)}$$

Figure 8:
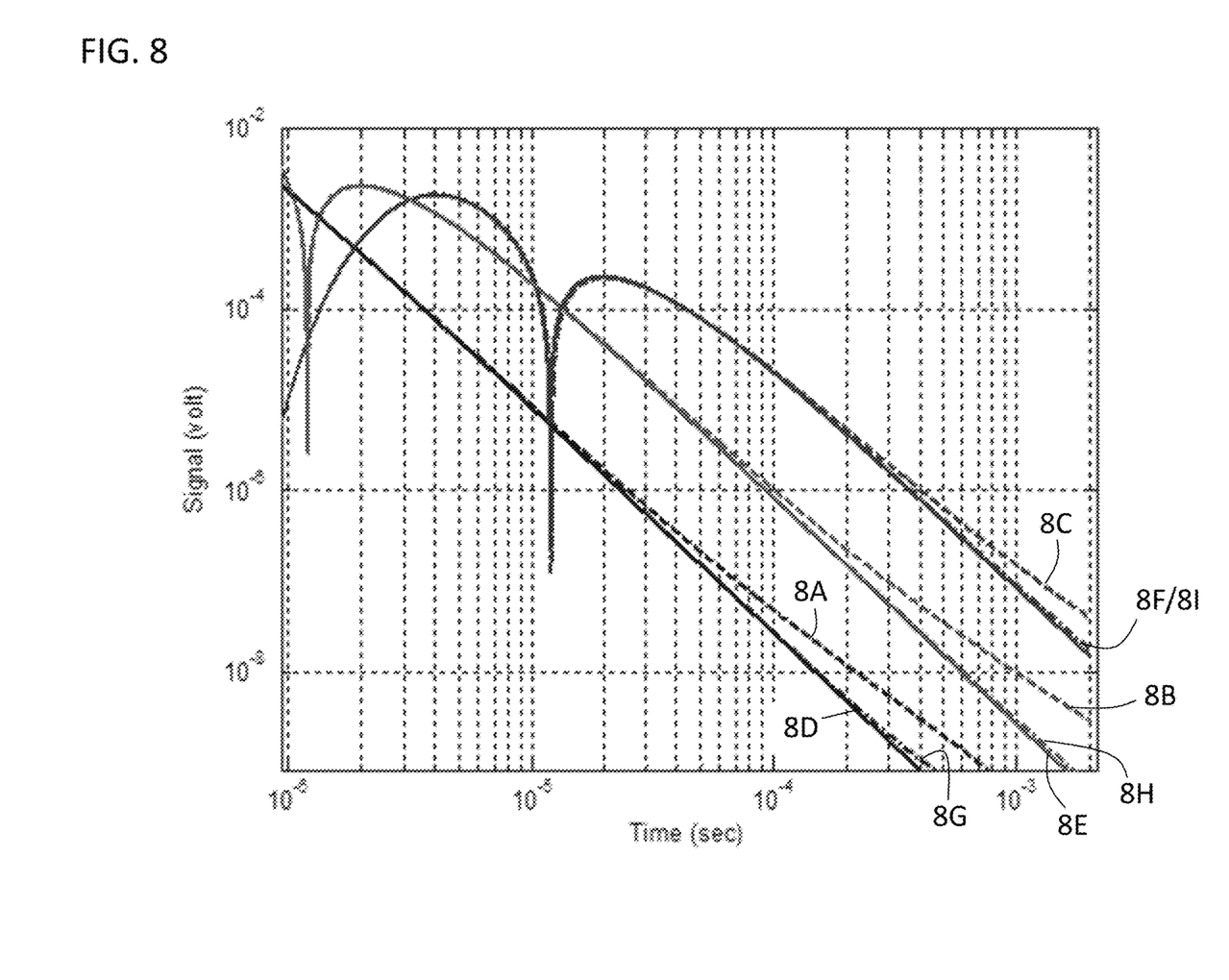
FIG. 8 is an enlarged illustrative plot of the corrective scheme in accordance with an embodiment of the present disclosure.

Applying the correction of Eq. (11) to the curves of FIG. 7, the corrected curves and bucked dipole curves overlay so well, that the difference cannot be seen on a full scale plot. However, turning to FIG. 8, a zoom of the corrected curve plot is shown in more detail. The measured curves are shown as dashed lines (8A-8C), bucked dipole responses are solid lines (8D-8F), and corrected curves are dash-dot (8G-8I). The corrected curves (8G-8I) match the bucked dipole curves quite well (8D-8F). Curves 8A, 8D, 8G are with a homogeneous formation resistivity of 100 Ω-m; Curves 8B, 8E, 8H are with a homogeneous formation resistivity of 10 Ω-m; and Curves 8C, 8F, 8I are with a homogeneous formation resistivity of 1 Ω-m.

This correction method can be applied before inversion, and eliminates the need to do convolution correction during inversion. Normally, measurement of the pipe response would be conducted using an air-hang test. This pipe curve would be stored and used for the correction of Eq. (11). Alternately, the pipe signal can be measured on-the-fly using a bucking algorithm to extract the pipe signal from the two receiver measurements.

Figure 9:
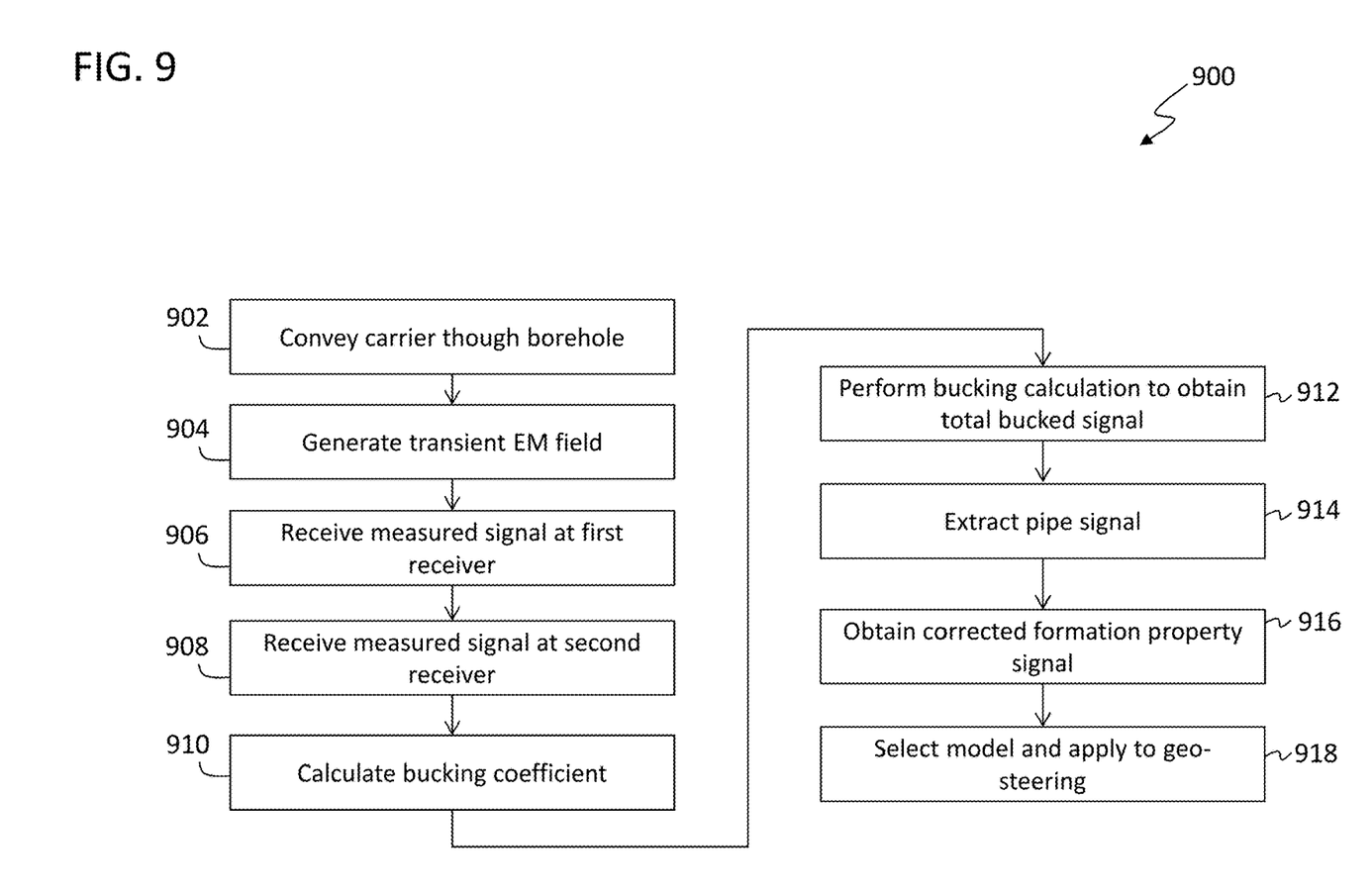
FIG. 9 is a flow process for estimating a property of an earth formation penetrated by a borehole in accordance with an embodiment of the present disclosure.

Turning now to FIG. 9, a flow process in accordance with an embodiment of the present disclosure is shown. The flow process 900 can be performed downhole with a transmitter and two associated receivers located at first and second distances from the transmitter (e.g., as shown in FIG. 4). The flow process 900 can be used to generate a correction to suppress the effect of pipe signal on the measured signal to obtain a faithful representation of the formation signal, which is then used to produce an accurate representation of the formation properties. Further, because the process 900 can be performed in situ, any changes in a pipe signal due to bending, temperature, and/or other variables that can affect pipe resistivity and/or conductivity downhole can be accounted for.

At block 902, a carrier having a tool is conveyed downhole. Conveying the carrier and tool can be performed in any of known processes. Further, the carrier can be part of a wireline tool or part of a drill string, or other downhole conveyance structure, without departing from the scope of the present disclosure. In one embodiment, the tool is configured on a drill string and the process 900 is used to adjust and/or modify a drilling operation such as to apply geo-steering to the drilling operation in response to detected and/or estimated formation properties. The tool includes a transmitter, a main receiver, and a bucking receiver (e.g., as shown in FIGS. 4, 6).

At block 904, the transmitter is used to generate a transient electromagnetic field downhole. The generated transient electromagnetic field will induce a response in the formation that is around the borehole and also induce a response in the carrier that the transmitter is configured on.

At block 906, a measured signal will be detected at a first receiver. The first receiver may be a main receiver. Similarly, at block 908, a measured signal will be detected at a second receiver. The second receiver may be a bucking receiver. As will be appreciated by those of skill in the art, the two signals of block 906, 908 will be slightly different, and thus the two signals can be used to extract out certain features of the signals.

In block 910 a bucking coefficient is calculated. The bucking coefficient can be calculated as a cube of the ratio of the receiver-to-transmitter distances. For example, Eq. (4) described above can be used to calculate the bucking coefficient k. However, those of skill in the art will appreciate that other methods and/or calculations can be used to calculate the bucking coefficient k, without departing from the scope of the present disclosure.

Knowing the signals at the first and second receivers and the bucking coefficient k, a bucking calculation can be performed at block 912. The bucking calculation of block 912, in accordance with one non-limiting embodiment, employs Eq. (5), as described above. The total bucked signal represents the transient formation response combined with a spurious response caused by the formation response to the carrier pipe currents. Because the pipe signal can impact formation estimates and approximations adversely, it is advantageous to remove the pipe signal from the bucked signal.

The pipe signal that causes error in the bucked signal, described above, can be measured using various different methods. For example, the pipe signal can be measured using a separate bucking calculation for in situ measurement, an experimental air hang test, or a computer simulation of the carrier response. After measurement, the pipe signal is stored for application of a correction to the bucked signal to pipe current induced errors. In the case of in situ pipe signal measurement the pipe signal is updated repeatedly in real time to reflect changes in the pipe signal. In air hang or computer simulation based pipe signal measurements the stored pipe signal may not be updated.

At block 914, a correction scheme is applied to the total signal using the measured pipe signal. For example, the correction scheme discussed with respect to Eqs. (6)-(11) can be applied. At block 916, a corrected formation signal can be extracted from the application of the correction scheme to the total signal.

The corrected formation signal can then be used to select a model and geo-steering can be appropriately adjusted (e.g., the pipe-suppressed signal can be saved, stored, processed, etc. to enable improved formation estimation and geo-steering) as shown at block 918.

Embodiments provided herein enable significant steps in the development of downhole transient electromagnetic tools. When implemented, embodiments as described herein provide various advantages. For example, correction of measured signal to suppress effects of pipe currents allows reduction of the tool length to a single subassembly, e.g., 20 to 25 feet in length. Reductions in tool length can eliminate challenging problems associated with time synchronization of the transmitter to receiver(s) when the components are located on separate subassemblies.

In accordance with some embodiments, the formation property obtained through the above described processes is a resistivity of an earth formation such that an operator may make informed decisions regarding geo-steering. Accordingly, embodiments provided herein may improve downhole operations, including but not limited to, improving efficiencies in measurement-while-drilling operations.

In sum, in accordance with embodiments provided herein, a method and/or process for determining a resistivity property of an earth formation (or other properties) is provided. The process includes producing a transient electromagnetic signal using a transmitter on a carrier downhole (or in situ). Using two receivers on the carrier, downhole, formation signals are detected. Unavoidably, these formation signals are convolved with a spurious pipe signal which is caused by currents in the carrier. A bucking coefficient k can be calculated using a processor, with the bucking coefficient based on a ratio of distances between the receivers and the transmitter or measured experimentally. Knowing the bucking coefficient, a bucking calculation can be performed to extract a total bucked signal representing the formation transient response signal combined with an error signal caused by the spurious pipe signal interaction with the formation. This pipe signal is known from measurements by an air hang test, by using an in situ pipe measurement method, or by using computer simulation of the electromagnetic response of the carrier. Using the known pipe signal, the correction method described here is used to suppress the error in the total bucked signal to extract a faithful representation of the transient formation response.

Set forth below are some embodiments of the foregoing disclosure:

Embodiment 1

A method for estimating a property of an earth formation penetrated by a borehole, the method comprising: conveying a carrier through a borehole, the carrier having a transmitter, a first receiver, and a second receiver, the first receiver being positioned at a first distance from the transmitter and the second receiver being positioned at a second distance from the transmitter; generating a transient electromagnetic field with the transmitter; obtaining a total signal from signals received by the first receiver and the second receiver; performing a bucking calculation to obtain a pipe signal; applying a correction scheme to the total signal to generate a corrected formation property signal, wherein the correction scheme is $V_{corr}=V_{meas}-P*V_{meas}$, wherein $V_{corr}$ is a correction signal, $V_{meas}$ is the total signal, and P is the pipe signal; estimating a formation property from corrected formation property signal to select a model of the formation; and adjusting a drilling operation based on the estimated property of the formation.

Embodiment 2

The method of embodiment 1, further comprising: receiving a first measured signal at the first receiver due to the transient electromagnetic field; receiving a second measured signal at the second receiver due to the transient electromagnetic field; obtaining the total signal from the first measured signal and the second measured signal; calculating a bucking coefficient k based on a ratio of the second distance to the first distance; and performing the bucking calculation employing the bucking coefficient k, the first measured signal, and the second measured signal to extract a measured bucked signal containing a formation dipole response plus an undesired formation pipe response.

Embodiment 3

The method of embodiment 2, wherein the bucking coefficient $$k = \left(\frac{d_2}{d_1}\right)^3.$$

Embodiment 4

The method of embodiment 2, wherein the bucking calculation comprises $V_1-kV_2=M[F_1(t)-kF_2(t)]+MP*[F_1(t)-kF_2(t)]$, wherein V1 is a voltage at the first receiver, V2 is a voltage at the second receiver, M is a transmitter-receiver moment product, P is the pipe signal, and F1 and F2 are the responses to the formation.

Embodiment 5

The method of embodiment 1, wherein the application of the correction scheme is performed in situ.

Embodiment 6

The method of embodiment 1, wherein the property of the formation is a resistivity of the formation.

Embodiment 7

The method of embodiment 1, further comprising measuring the pipe signal P in one of in situ, using an air-hang test, or using a computer simulation of a transient carrier response.

Embodiment 8

A system for estimating a property of an earth formation penetrated by a borehole, the system comprising: a carrier configured to be conveyed through a borehole; a transmitter disposed on the carrier and configured to transmit transient electromagnetic fields; a first receiver disposed on the carrier a first distance from the transmitter and configured to receive signals from the transmitter; a second receiver disposed on the carrier a second distance from the transmitter and configured to receive signals from the transmitter; and a processor configured to estimate a property of the formation, the system configured to: generate a transient electromagnetic field with the transmitter; obtain a total signal from signals received by the first receiver and the second receiver; perform a bucking calculation to obtain a pipe signal; apply a correction scheme to the total signal to generate a corrected formation property signal, wherein the correction scheme is $V_{corr}=V_{meas}-P*V_{meas}$, wherein $V_{corr}$ is a correction signal, $V_{meas}$ is the total signal, and P is the pipe signal; and estimate a formation property from corrected formation property signal to select a model of the formation.

Embodiment 9

The system of embodiment 8, the processor further configured to adjust a drilling operation based on the estimated property of the formation.

Embodiment 10

The system of embodiment 8, the processor further configured to: receive a first measured signal at the first receiver due to the transient electromagnetic field; receive a second measured signal at the second receiver due to the transient electromagnetic field; obtain the total signal from the first measured signal and the second measured signal; calculate a bucking coefficient k based on a ratio of the second distance to the first distance; and perform the bucking calculation employing the bucking coefficient k, the first measured signal, and the second measured signal to extract a measured bucked signal containing a formation dipole response plus an undesired formation pipe response.

Embodiment 11

The system of embodiment 10, wherein the bucking coefficient $$k = \left(\frac{d_2}{d_1}\right)^3.$$

Embodiment 12

The system of embodiment 10, wherein the bucking calculation comprises $V_1-kV_2=M[F_1(t)-kF_2(t)]+MP^*[F_1(t)-kF_2(t)]$, wherein V1 is a voltage at the first receiver, V2 is a voltage at the second receiver, M is a transmitter-receiver moment product, P is the pipe signal, and F1 and F2 are the responses to the formation.

Embodiment 13

The system of embodiment 8, wherein the application of the correction scheme is performed in situ.

Embodiment 14

The system of embodiment 8, wherein the property of the formation is a resistivity of the formation.

Embodiment 15

The system of embodiment 8, wherein the carrier further comprises a controller configured to receive information from the first receiver and the second receiver and further configured to perform the correction scheme.

Embodiment 16

The method of embodiment 8, wherein the pipe signal P is one of measured in situ, measured using an air-hang test, or measured using a computer simulation of a transient carrier response.

The systems and methods described herein provide various advantages. For example, embodiments provided herein represent a significant advance in the processing of transient EM signals. The processes described herein allow correction of a measured signal for formation response to pipe currents in a way that can be applied prior to use of standard inversion programs such as MCWD. Such prior-application enables a significant advantage over alternative correction methods, which may require application of a convolution correction at each iteration of the inversion. The method and processes described herein can be used in conjunction with a bucked pipe measurement to apply corrections downhole based on in situ measurement of the pipe response. Accordingly, advantageously, compensation for changes in pipe signal that occur with bending and with changes in pipe conductivity with downhole temperature can be accounted for using embodiments provided herein.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a particular order, but are used to distinguish different elements.

The flow diagram depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A method for estimating a property of an earth formation penetrated by a borehole, the method comprising:
conveying a carrier through a borehole, the carrier having a transmitter, a first receiver, and a second receiver, the first receiver being positioned at a first distance from the transmitter and the second receiver being positioned at a second distance from the transmitter;
generating a transient electromagnetic field with the transmitter;
obtaining a total signal from signals received by the first receiver and the second receiver, wherein the total signal includes a carrier induced signal;
performing a bucking calculation to obtain a pipe signal;
applying a correction scheme to the total signal to generate a corrected formation property signal, wherein the correction scheme is $V_{corr}=V_{meas}-P*V_{meas}$ wherein $V_{corr}$ is a correction signal, $V_{meas}$ is the total signal, and P is the pipe signal;
estimating a formation property from corrected formation property signal to select a model of the formation; and
adjusting a drilling operation based on the estimated property of the formation, wherein the adjusting comprises applying geo-steering in response to the estimated property of the formation.

2. The method of claim 1, further comprising:
receiving a first measured signal at the first receiver due to the transient electromagnetic field;
receiving a second measured signal at the second receiver due to the transient electromagnetic field;
obtaining the total signal from the first measured signal and the second measured signal;
calculating a bucking coefficient k based on a ratio of the second distance to the first distance; and
performing the bucking calculation employing the bucking coefficient k, the first measured signal, and the second measured signal to extract a measured bucked signal containing a formation dipole response plus an undesired formation pipe response.

3. The method of claim 2, wherein the bucking coefficient $$k = \left(\frac{d_2}{d_1}\right)^3.$$

4. The method of claim 2, wherein the bucking calculation comprises $V_1-kV_2=M[F_1(t)-kF_2(t)]+MP*[F_1(t)-kF_2(t)]$, wherein $V_1$ is a voltage at the first receiver, $V_2$ is a voltage at the second receiver, M is a transmitter-receiver moment product, P is the pipe signal, and $F_1$ and $F_2$ are the responses to the formation.

5. The method of claim 1, wherein the application of the correction scheme is performed in situ.

6. The method of claim 1, wherein the property of the formation is a resistivity of the formation.

7. The method of claim 1, further comprising measuring the pipe signal P in one of in situ, using an air-hang test, or using a computer simulation of a transient carrier response.

8. A system for estimating a property of an earth formation penetrated by a borehole, the system comprising:
a carrier configured to be conveyed through a borehole;
a transmitter disposed on the carrier and configured to transmit transient electromagnetic fields;
a first receiver disposed on the carrier a first distance from the transmitter and configured to receive signals from the transmitter;
a second receiver disposed on the carrier a second distance from the transmitter and configured to receive signals from the transmitter; and
a processor configured to estimate a property of the formation, the system configured to:
generate a transient electromagnetic field with the transmitter;
obtain a total signal from signals received by the first receiver and the second receiver;
perform a bucking calculation to obtain a pipe signal;
apply a correction scheme to the total signal to generate a corrected formation property signal, wherein the correction scheme is $V_{corr}=V_{meas}-P*V_{meas}$, wherein $V_{corr}$ is a correction signal, $V_{meas}$ is the total signal, and P is the pipe signal; and
estimate a formation property from corrected formation property signal to select a model of the formation.

9. The system of claim 8, the processor further configured to adjust a drilling operation based on the estimated property of the formation, wherein the adjustment comprises applying geo-steering in response to the estimated property of the formation.

10. The system of claim 8, the processor further configured to:
receive a first measured signal at the first receiver due to the transient electromagnetic field;
receive a second measured signal at the second receiver due to the transient electromagnetic field;
obtain the total signal from the first measured signal and the second measured signal;
calculate a bucking coefficient k based on a ratio of the second distance to the first distance; and
perform the bucking calculation employing the bucking coefficient k, the first measured signal, and the second measured signal to extract a measured bucked signal containing a formation dipole response plus an undesired formation pipe response.

11. The system of claim 10, wherein the bucking coefficient $$k = \left(\frac{d_2}{d_1}\right)^3.$$

12. The system of claim 10, wherein the bucking calculation comprises $V_1-kV_2=M[F_1(t)-kF_2(t)]+MP*[F_1(t)-kF_2(t)]$, wherein $V_1$ is a voltage at the first receiver, $V_2$ is a voltage at the second receiver, M is a transmitter-receiver moment product, P is the pipe signal, and $F_1$ and $F_2$ are the responses to the formation.

13. The system of claim 8, wherein the application of the correction scheme is performed in situ.

14. The system of claim 8, wherein the property of the formation is a resistivity of the formation.

15. The system of claim 8, wherein the carrier further comprises a controller configured to receive information from the first receiver and the second receiver and further configured to perform the correction scheme.

16. The method of claim 8, wherein the pipe signal P is one of measured in situ, measured using an air-hang test, or measured using a computer simulation of a transient carrier response.

* * * * *